United States Patent [19]

Bae

[11] Patent Number: 5,721,767
[45] Date of Patent: Feb. 24, 1998

[54] VIDEO PLAYER WITH TELEPHONE INTERFACE TO PROVIDE TELEPHONE ANSWERING AND DIALING FUNCTIONS WITH ON-SCREEN DISPLAY

[75] Inventor: Jum-han Bae, Suwon, Rep. of Korea

[73] Assignee: Samsung Electronics Co., Ltd., Kyungki-do, Rep. of Korea

[21] Appl. No.: 602,382

[22] Filed: Feb. 16, 1996

[30] Foreign Application Priority Data

Feb. 18, 1995 [KR] Rep. of Korea ................. 95-3163

[51] Int. Cl.[6] .................................................. H04M 11/00
[52] U.S. Cl. ...................... 379/102.03; 379/67; 379/354
[58] Field of Search ............................... 379/102, 104, 379/105, 67–89, 354–357, 102.01, 102.03; 348/14

[56] References Cited

U.S. PATENT DOCUMENTS

| 4,829,555 | 5/1989 | Hashimoto | 379/70 |
| 5,189,691 | 2/1993 | Dunlap | 379/70 |
| 5,345,258 | 9/1994 | Matsubara et al. | 379/102 |

FOREIGN PATENT DOCUMENTS 1-98356  4/1989  Japan.

*Primary Examiner*—Wing F. Chan
*Attorney, Agent, or Firm*—Sughrue, Mion, Zinn, Macpeak & Seas, PLLC

[57] ABSTRACT

A video cassette recorder (VCR) is provided with an interface with a telephone jack and a telephone so as to function as an automatic telephone answering machine and as an telephone directory for dialing telephone numbers selected by a user from a list provided via an on-screen display. When an incoming call is received via the telephone jack, a controller determines if the telephone has not been answered within a predetermined amount of time. When the predetermined amount of time lapses without pickup, the VCR records a message from the incoming caller. The telephone number of the incoming caller is also recorded. In the telephone directory mode of operation, a user inputs commands via a key input to select a name and corresponding telephone number from an on-screen display of stored telephone number data and corresponding name data. A controller inside the VCR then causes the selected number to be automatically dialed.

9 Claims, 4 Drawing Sheets

FIG. 4

| NAME | : | TELEPHONE NUMBER |
|---|---|---|
| △△△ | : | ××× — ×××× |

VIDEO PLAYER WITH TELEPHONE INTERFACE TO PROVIDE TELEPHONE ANSWERING AND DIALING FUNCTIONS WITH ON-SCREEN DISPLAY

BACKGROUND OF THE INVENTION

The present invention relates to a video player having a telephone service function, and more particularly, to a video player having a telephone service function incorporating a general service function of a telephone set with a service function of a video player such as a video cassette recorder.

Recently, people increasingly take an interest in home automation systems for providing convenience of home life and ensuring safety by combining various equipment with each other. Thus, a system for preventing disasters and to ensure safety and security, and a telecontrol system for performing an on/off control of an air conditioner or electric rice cooker, correction and confirmation of the on/off control from the outside have been put to practical use. Such systems are slowly find wide spread application in the home. An extended home automation function is needed according to such a trend.

SUMMARY OF THE INVENTION

Therefore, it is an object of the present invention to provide a video player having a telephone service function.

To accomplish the above objective of the present invention, there is provided a video player/recorder (i.e., VCR) for recording and playing back information from a recording medium. The VCR has a user key input for receiving input information (such as telephone numbers) from a user. The VCR also has a telephone signal port and a codec for decoding a telephone signal received via the telephone signal port and encoding another telephone signal to be transmitted via the telephone signal port. A message storage means is provided in the VCR for storing audio guide message information. A first control means is provided to respond to a key input via the user key input means, and a second control means is provided for communicating between the codec and the first control means.

The first control means controls the second control means and the video player according to key inputs. The second control means, in response to a decoded telephone signal supplied from the codec, controls the first control means and also controls the message storage means to output the stored audio guide message information to the codec so as to perform an automatic telephone answering function.

The VCR according to the present invention provides an interface with a telephone jack and a telephone so as to function as an automatic telephone answering machine and as an telephone directory for dialing telephone numbers selected by a user from a list provided via an on-screen display. When an incoming call is received via the telephone jack, a controller determines if the telephone has not been answered within a predetermined amount of time. When the predetermined amount of time lapses without pickup, the VCR records a message from the incoming caller. The telephone number of the incoming caller is also recorded.

The VCR acts as a telephone directory when a user inputs commands via a key input to select a name and corresponding telephone number from an on-screen display of stored telephone number data and corresponding name data. The VCR then automatically dials the selected number.

BRIEF DESCRIPTION OF THE DRAWINGS

The above objects and other advantages of the present invention will become more apparent by describing in detail preferred embodiments thereof with reference to the attached drawings in which:

FIG. 4 is a view showing an example of names and telephone numbers which are displayed on a screen by means of the FIG. 1 apparatus.

DETAILED DESCRIPTION OF THE PREFERRED EMBODIMENT

A preferred embodiment of the present invention will be described below in more detail with reference to the accompanying drawings FIGS. 1 to 4.

Figure 1:
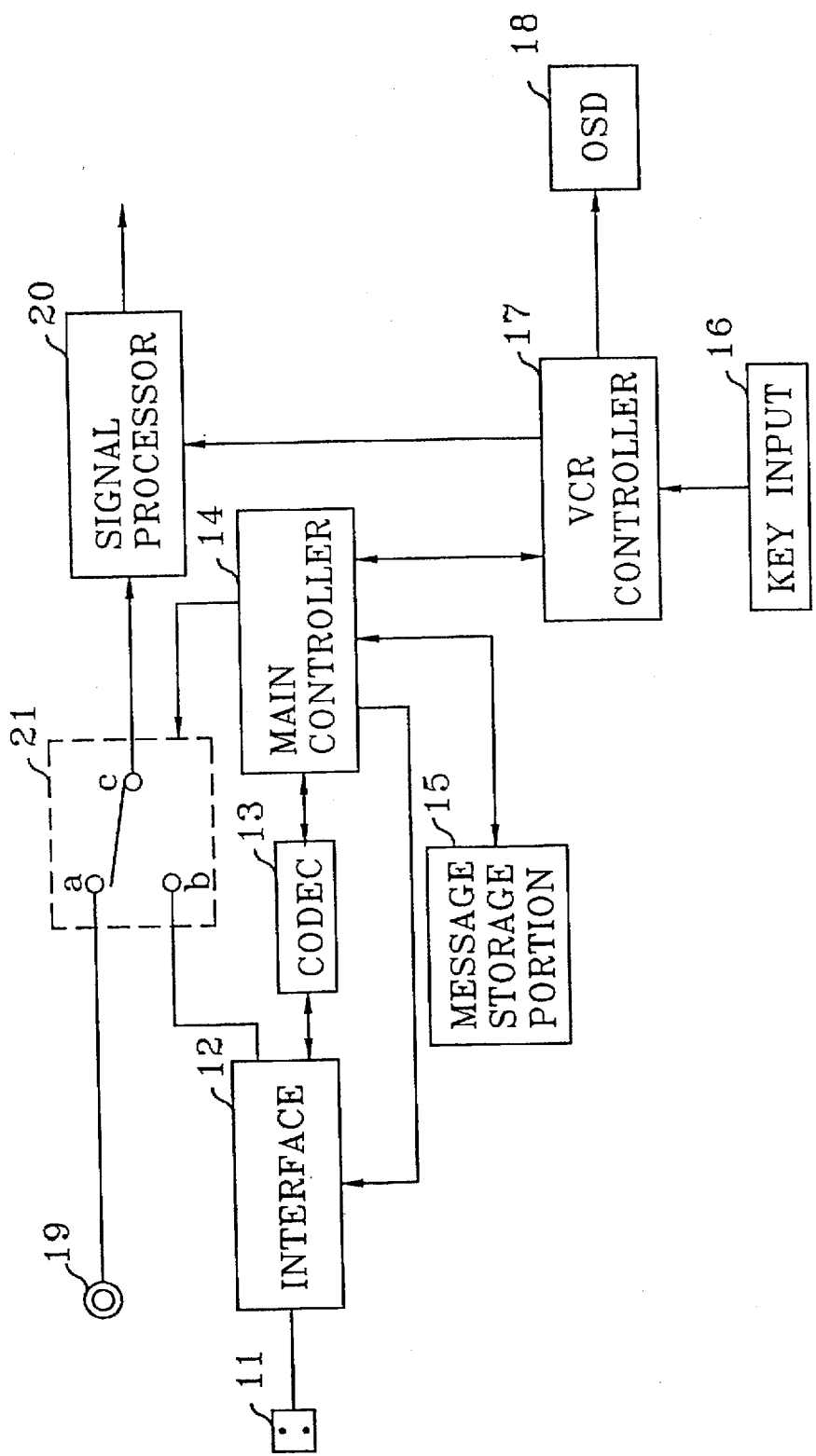
FIG. 1 is a block diagram showing a video cassette recorder according to a preferred embodiment of the present invention.

In FIG. 1 showing a video cassette recorder (VCR) according to a preferred embodiment of the present invention, an interface portion 12 connected to a telephone line jack 11 transmits a signal input through the telephone line jack 11 to a switch portion 21 and a codec 13. The codec 13 demodulates a signal received from the interface portion 12 and supplies the demodulated signal to a main controller 14. The codec 13 also modulates the output signal of the main controller 14 and supplies the modulated signal to the interface portion 12. The main controller 14 which exchanges control signals with a VCR controller 17 controls the operation of the switch portion 21 according to the output signal of the VCR controller 17 and that of the codec 13. A message storage portion 15 connected to the main controller 14 stores message information for an audio guide service.

The switch portion 21 controlled by the main controller 14 includes a fixed contact a connected to an audio jack 19, a fixed contact b connected to the interface portion 12 and a movable contact c connected to a signal processor 20. The signal processor 20 performs a signal processing for recording and reproduction with respect to the output signal of the switch portion 21 according to the control of the VCR controller 17. The signal processor 20 is controlled by the VCR controller 17 which responds to a user command input through the key input portion 16, and generates a video signal which represents subscriber's name and his telephone number to be displayed on a screen of a telephone set. The key input portion 16 includes an up/down key and a select key which correspond to an on-screen-display (OSD) portion 18 and which select one of telephone numbers displayed on a screen, and keys for conventional VCR functions such as a reservation recording function.

The FIG. 1 apparatus is connected to the telephone set and the telephone line jack 11 is connected to a telephone line. The interface portion 12 transmits the telephone signal transmitted through the telephone line jack 11 to the codec 13. The codec 13 has functions of a coder and a decoder, and converts a successive analog quantity into a certain code system using the coder function, and converts the code system into the analog quantity using the decoder function. The codec 13 code-converts the input telephone signal into a form which can be processed in the main controller 14. The code-converted telephone signal is input to the main controller 14. The main controller 14, responding to the input telephone signal, determines whether or not an automatic answer function and memory function, or a remote reservation function with an absent call will be performed. The main controller 14 also controls the telephone call function according to the control signal from the VCR controller 17.

Figure 2:
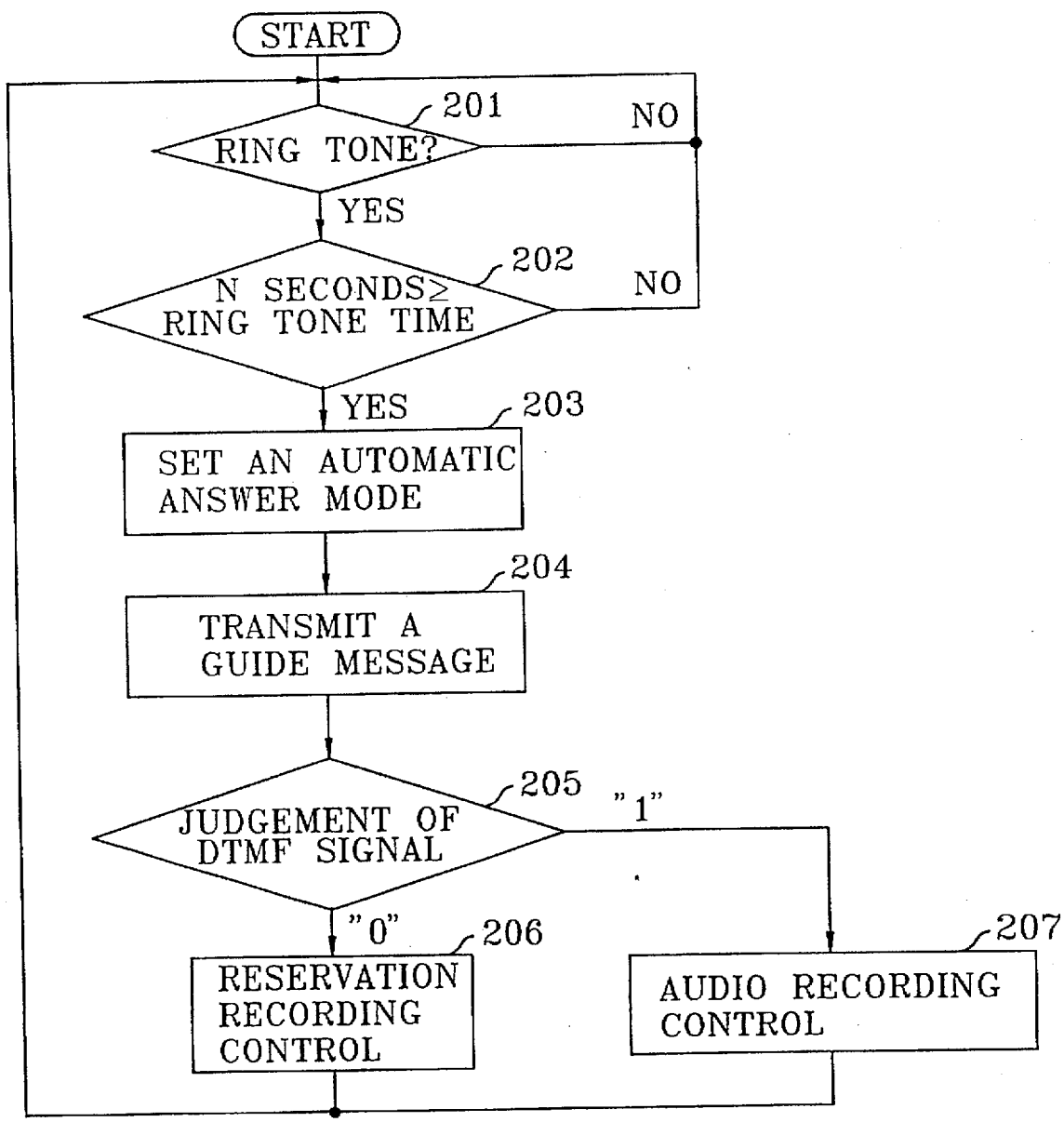
FIG. 2 is a flowchart diagram for explaining performance of message transmission, reservation recording and audio recording with the FIG. 1 apparatus.

The automatic answer function, the memory function and the remote reservation function will be described below with reference to the FIG. 2 flowchart.

The main controller 14 checks if there is a ring tone via the telephone line connected in a step 201. If there is a ring tone in the step 201, the main controller 14 judges whether the ring tone continues for a predetermined time of N seconds in a step 202. If the ring tone continues for the predetermined time of the N seconds, that is, if the ring tone time is not more than N seconds, the main controller 14 judges that a user does not receive the telephone call or is absent. The main controller 14 sets the automatic answer mode for responding to a telephone signal applied from codec 13 in a step 203. The main controller 14 reads guide message data which is pre-stored in a message storage portion 15 and transmits the read guide message data to the codec 13 in a sleep 204. Then, the main controller 14 enters a standby state for judging whether a dual tone multi-frequency (DTMF) is transmitted from a transmit subscriber. The codec 13 converts the guide message data supplied from the main controller 14 into an analog form which can be transmitted via a telephone line. The converted signal is transmitted to a transmit subscriber via the interface portion 12 and the connected telephone line. Thus, the transmit subscriber can hear, via the telephone receiver, of guide messages such as an example of the user is at this time absent. Please press a key of No. 0 for reservation recording and a key of No. 1 for audio recording.

If the transmit subscriber presses a key of either zero or one after listening to the above-described guide message, a DTMF signal which has been produced in this case is transmitted from the transmit subscriber to the FIG. 1 apparatus. When the DTMF signal is input to the codec 13 via the telephone line jack 11 and the interface portion 12, the codec 13 demodulates the input signal and transmits the demodulated signal to the main controller 14.

If the DTMF signal is judged as a signal generated by press of the zero-key for the reservation recording in a step 205, the main controller 14 generates a reservation recording mode signal in a step 206, and generate the reservation recording mode signal to be supplied to the VCR controller 17. At this time a reservation recording information signal transmitted from the transmit subscriber together with the DTMF signal is also supplied to the VCR controller 17. The VCR controller 17 performs a reservation recording operation according to the reservation recording mode signal of the main controller 14 and the reservation recording information signal supplied together with the reservation recording mode signal. Thus, the VCR controller 17 can perform a reservation recording control when the reservation recording information signal is for recording a specific television broadcasting program, as well as a reservation release operation when the reservation recording information signal is for releasing the reservation of the designated specific program. Taking a reservation recording example, the VCR controller 17 stores the reservation recording information signal, and controls the movable contact c of the switch portion 21 to be connected to the fixed contact a thereof if it becomes a reserved recording time or a reserved program input time. An audio signal corresponding to a desired program to be input via the audio jack 19 is processed by the signal processor 20. Then, although it is not shown, a video signal corresponding to the desired program is also processed so as to be reservation-recorded by the corresponding signal processor. Therefore, as is apparent to a person who is skilled in the art the audio jack 19 and the signal processor 20 shown in FIG. 1 can be functionally extended into a form so as to process the video signal and the audio signal of the television broadcasting signal.

Meanwhile, if it is judged that the DTMF signal is generated by the press of the key of No. 1 for the audio recording in the step 205, the main controller 14 controls the VCR controller 17 and the switch portion 21, to record the audio signal transmitted from the transmit subscriber together with the DTMF signal on a recording medium (not shown) in a step 207. By such a control of the main controller 14, the movable contact c of the switch portion 21 is connected to the fixed contact b. The VCR controller 17 controls the signal processor 20 to process the output signal of the switch portion 21 into a recordable form. Thus, the signal processor 20 can record the signal supplied via the switch potion 21 from the interface portion 12 on the recording medium. The recording medium is preferably a semiconductor memory or a magnetic tape.

After performance of the step 206 or 207 has completed, the main controller 14 performs again the step 201 in order to again perform the same processing operation as the above-described operation.

Figure 3:
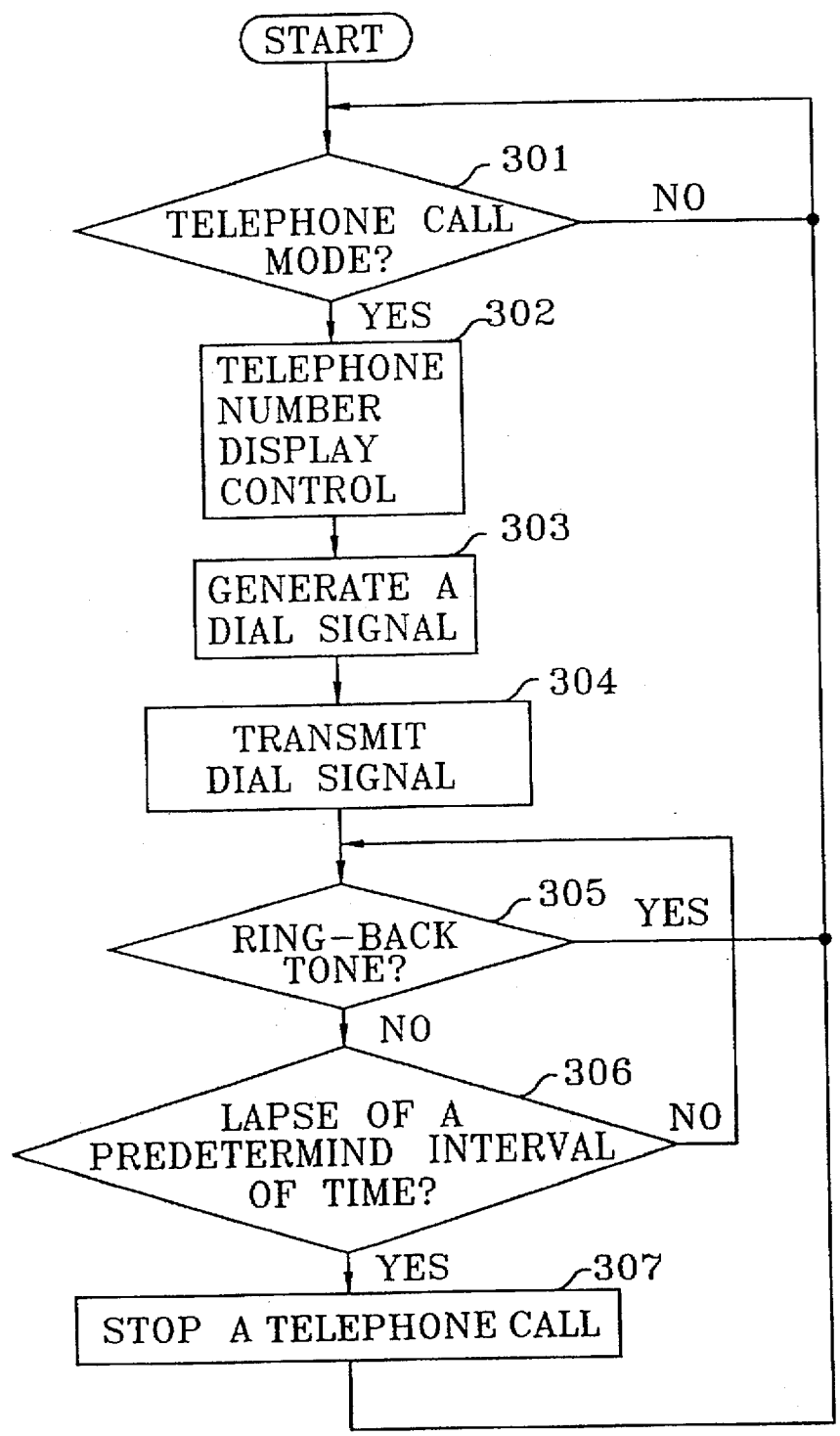
FIG. 3 is a flowchart diagram for explaining a telephone call function by means of the FIG. 1 apparatus.
Figure 4:
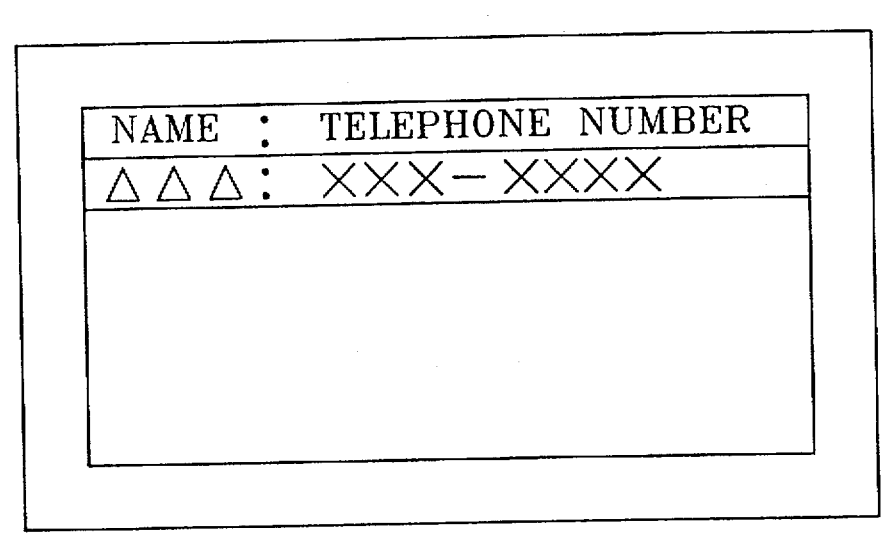

An operation of performing a user telephone call via the key input portion 16 will be described below with reference to FIGS. 3 and 4.

The main controller 14 judges whether a telephone call mode signal is input from the VCR controller 17 in a step 301. If the VCR controller 17 generates the telephone call mode signal in response to the user key input via the key input portion 16, the main controller 14 controls the VCR controller 17 so that a telephone number list comprised of names and telephone numbers is displayed on a screen in a step 302. The VCR controller 17 controls the stored telephone number list to be displayed on the screen as shown in FIG. 4. The OSD portion 18 generates an OSD signal for displaying the telephone number list in response to the above control of the VCR controller 17. If the user uses an up/down key and a select key in the key input portion 16 to select one of the displayed telephone numbers and one of the names, telephone number data corresponding or the selected telephone number or the name is supplied to the main controller 14. The main controller 14 generates a dial signal corresponding to the telephone number data output from the VCR controller 17 in a step 303, and outputs the generated dial signal to the codec 13 in a step 304. The codec 13 converts the dial signal into a DTMF signal form. The output signal of the codec 13 is transmitted to a designated counter-subscriber via the telephone line jack 11.

The main controller 14 checks whether there is a ring-back tone in the designated counter-subscriber in a step 305. If it is judged that there is no ring-back tone in the step 305, the main controller 14 continues to check whether there is a ring-back tone of the step 305 until a response standby interval of time is not less than a predetermined interval of time in a step 306. If it is judged that the response standby interval of time becomes not less than the predetermined interval of time in the step 306, the main controller 14 performs a step 307 to stop a telephone call. When connection is made with a designated counter-subscriber, the user can communicate a telephone call with the counter-subscriber via a telephone set (not shown) connected to the codec 13.

As described above, the video player having the telephone service function includes a general telephone function, thereby providing a telephone service function as well as the video player function to the user.

While only certain embodiments of the invention have been specifically described herein, it will apparent that numerous modifications may be made thereto without departing from the spirit and scope of the invention.

What is claimed is:

1. A video player for a video recording medium comprising:

user key input means;

a telephone signal port;

a codec for decoding a telephone signal received via said telephone signal port and encoding another telephone signal to be transmitted via said telephone signal port;

message storage means for storing audio guide message information;

first control means for responding to a key input via said user key input means; and second control means for providing communication between said codec and said first control means, wherein said first control means controls said second control means and the video player according to key input, and said second control means, in response to a decoded telephone signal supplied from said codec, controls said first control means and also controls said message storage means to output the stored audio guide message information to said codec so as to perform an automatic telephone answering function.

2. The video player according to claim 1, wherein said second control means controls said message storage means and said codec so that the stored audio guide message information is output via said telephone signal port when a ring tone is input via said codec for a predetermined interval of time.

3. The video player according to claim 2, further comprising:

signal processing means for processing the telephone signal supplied from said telephone signal port so as to be recorded on said recording medium;

interface means, coupled between said telephone signal port and said codec, for supplying the telephone signal received via said telephone signal port to said signal processing means and for outputting the telephone signal supplied from said codec to said telephone signal port; and a switch for on-and-off controlling the output signal of said interface means to be output to said processing means, wherein said second control means controls said switch so that the telephone signal input via said interface means is supplied to said processing means when the ring tone is input via said codec for the predetermined interval of time.

4. The video player according to claim 1, wherein said second control means controls said first control means according to a reservation recording signal when a signal for reservation recording is applied from said codec.

5. The video player according to claim 1, wherein said first control means generates telephone number data in response to the user key input via said user key input means, and said second control means generates a dial signal according to the telephone number data of said first control means and applies the generated dial signal to said codec.

6. The video player according to claim 5, wherein said second control means stops a telephone call when there is no ring-back tone from a counter-subscriber designated by the telephone number data for a second predetermined interval of time.

7. The video player according to claim 5, further comprising a display for displaying names and corresponding telephone numbers, wherein said first control means stores telephone number list information comprised of names data and corresponding telephone number data and supplies the names data and the corresponding telephone number data to said display according to the key input via said user key input means, while a selected telephone number data is supplied to said second control means as the generated telephone number data.

8. The video player according to claim 7, wherein said first control means controls said display so that a plurality of the names data and a plurality of the corresponding telephone number data in said telephone number list information are simultaneously displayed thereon.

9. The video player according to claim 1, wherein said video player is a video cassette recorder.

* * * * *